Sept. 10, 1940.     S. A. CARLSON     2,214,098
BELT
Filed Sept. 6, 1938
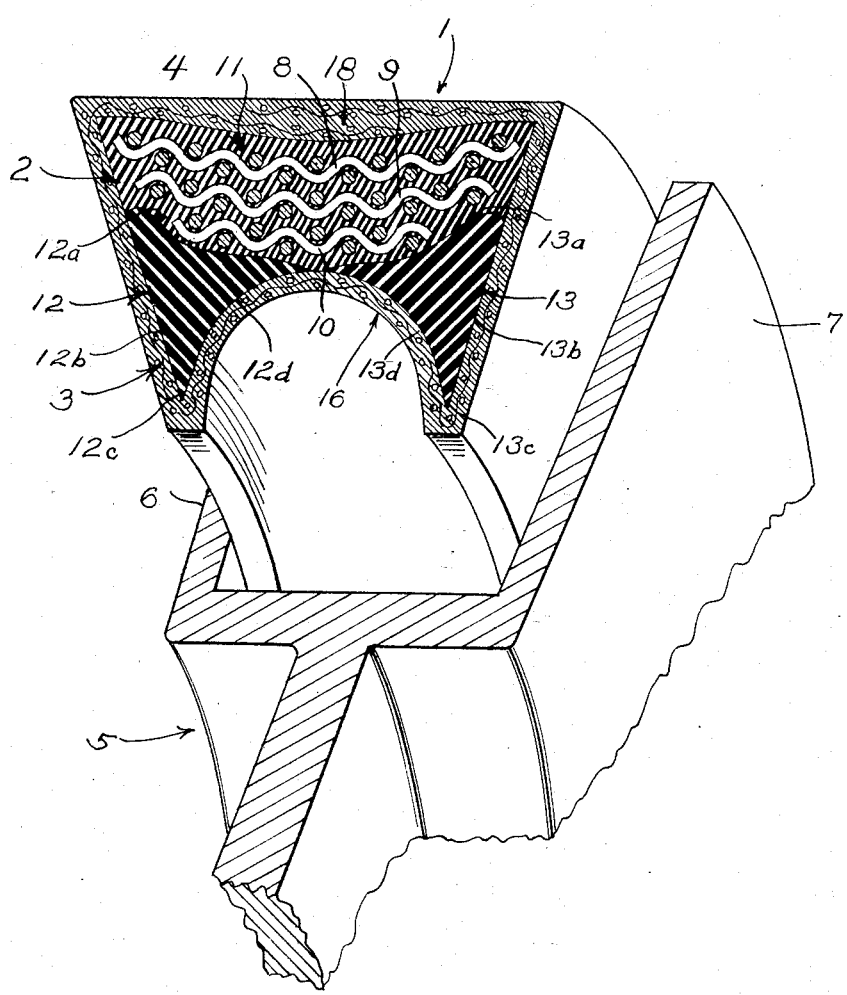
Inventor Patented Sept. 10, 1940

2,214,098

UNITED STATES PATENT OFFICE 2,214,098

BELT

Stanley A. Carlson, Carlstadt, N. J.

Application September 6, 1938, Serial No. 228,588

5 Claims. (Cl. 74—233)

My invention relates generally to transmission belts of the V-type, and the object and general nature of my invention is to produce a belt of this type which dissipates heat faster than ordinary V-belts, which, therefore, results in longer life.

A further object of my invention is to provide a V-belt having greater flexibility, requiring less power to flex the belt as it passes around a pulley, with resulting diminution of heat loss.

Another object of my invention is to produce a V-belt having an inner arch-forming groove against which a substantially inextensible tension member acts to cause the sides of the belt to hug the pulley groove, thereby giving added support to the tension member.

A further object of my invention is the provision of a V-belt of improved construction which can be operated more loosely than conventional belts with which I am familiar and which adjusts itself to fit worn pulley grooves.

These and other objects of my invention will be apparent from the following detailed description of a preferred form of my invention which is illustrated in the accompanying drawing, in which the single figure is a sectional view of a portion of an endless belt, and a portion of a pulley over which the belt is adapted to run.

Referring now to the drawing, the belt in which the principles of my invention have been embodied is indicated in its entirety by the reference numeral 1 and consists of a tension section 2, an arched compressible section 3, and a cover layer or wrapper 4. The belt 1 is adapted to operate over a pulley or sheave 5 having flaring side walls 6 and 7 disposed with respect to each other at about the same angle as the sides of the belt 1.

The tension section 2 comprises a pair of relatively stiff fabric strips 8 and 9, extending substantially the full width of the belt and curved radially outwardly to a slight degree, and a relatively narrow strip 10 disposed in about the center of the belt. The strips 8, 9 and 10 are preferably impregnated with soft rubber or rubberlike material 11.

The radially inner flexible section 3 of the belt comprises two bands or strips 12 and 13, generally triangular in section and preferably of rubber or rubberlike material having no fabric or cords, and hence relatively soft and flexible, but somewhat stiffer than the rubber stock in which the fabric strips 8, 9 and 10 are placed.

The members 12 and 13, which may, for all practical purposes be considered as one member, have their bases 12a and 13a disposed substantially against the tension member 2, lying directly against the rubber stock in which the narrow fabric strip 8 is disposed. The outer sides 12b and 13b of the members 12 and 13 form and are substantially coextensive with the sides of the belt, and the apices of the members 12 and 13 form flexible thin-walled feather edges 12c and 13c. The other sides 12d and 13d of the members 12 and 13 are generally curved so as to form a deep groove 16 at the inner periphery of the belt, which groove separates the thin edges 12c and 13c and extends substantially semi-circular in section to the narrow strip 10 of the tension member 2. As will be explained more particularly below, the section 3 of the belt forms an arch bridging across the sheave 5 from one side wall of the latter to the other, with the thin flexible edges 12c and 13c serving as bases for the arch formed by the groove 16.

The members 2 and 3 are embraced by the cover layer 4 which consists of a light fabric impregnated with soft rubber or rubberlike stock, preferably the same as the material with which the strips or bands 8, 9 and 10 are impregnated. The cover layer 4 is overlapped, as indicated at 18, with the double thickness laying in the central portion of the outwardly curved tension member 2.

After assembly in the manner shown and described above, the whole is vulcanized in a suitable mold or by any other means desired.

In operation, the belt 1 is trained over two pulleys, one of which is fragmentarily shown in the drawing, and each of which has a pair of flanges forming a groove, the side walls of which are usually disposed at an angle of approximately 30°, the side walls of the belt having about the same angularity, but ordinarily the belt does not bottom in the pulley groove. Instead, the belt wedges in between the sides of the pulley flanges. In the transmission of power from one pulley to the other, the belt flexes as it passes around the pulley.

Ordinary V-belts of solid cross section tend to bulge in the center when they are flexed due to the tension in the outer portion and the compression in the inner portion. This reduces the area of contact, causes the belt to slip, and increases the wear of the belt. The belt of my invention, however, does not appreciably tend to bulge; instead, the side walls remain substantially in their original angular position. This is due, I believe, first, to the fact that the tension member 2 is curved inwardly, so that as the belt is flexed, the tension member tends to flatten, and, at least partially, offsets the effect of the peripheral tension tending to draw in the outer portions of the belt side walls, and, second, the downward or radially inward pull, as the belt passes around a pulley, upon the walls of the deep groove causes the latter to act as an arch, whereby the force is transmitted laterally to the flexible thin-walled edges 12c and 13c, crowding them against the pulley flanges. This action, which would not be present, I believe, unless the groove is deep and the edges relatively thin and flexible, furnishes support for the tension member, and, in addition, prevents the belt from being forced to the bottom of the pulley groove. It also permits the belt to adjust itself to fit worn pulley flanges, and gives the belt a more positive grip on the pulley, so that the belt can be operated more loosely, requiring less frequent take-up and less power wasted and heat loss in flexing the belt.

Another advantage of the deep grooved construction of the belt and the thin-walled inner edges is that the heat that is generated, although less than in ordinary belts, is dissipated more rapidly, with resulting longer life for the belt. The extensive surface, in contact with the air, provided by the deep groove ensures rapid heat dissipation, and moreover a considerable mass of air is actually carried around with the belt and in between the flanges of the pulley. Thus, there is a quantity of air in extensive thermal contact with the belt at the moment of its most severe flexure, whereby the heat due to the internal friction is practically immediately taken out of the belt by its contact with the air within the pulley, instead of passing into other portions of the belt and causing disintegration of the belt after a time.

I claim:

1. A transmission belt of the V-type for use with a grooved pulley, comprising a substantially inextensible tension member in the outer and wider portion of the belt formed of one or more relatively stiff fabric strips extending substantially the full width of the belt and an inner narrow relatively stiff fabric strip, said strips having a relatively slight curvature in section whereby the tension member tends to flatten and expand laterally at the outer periphery of the belt when passing around a relatively small pulley, and an inner flexible compressible section having a deep groove extending from the inner periphery of the belt substantially radially outwardly to the inner narrow strip and having thin edges at the inner periphery of the belt adapted to be forced laterally outwardly when the belt passes around a pulley.

2. A transmission belt as defined in claim 1 further characterized by a cover layer embracing said tension member and said grooved section, the radially outer portion of said tension member being curved inwardly, said layer comprising a soft rubber-impregnated fabric strip with edges overlapping and lying adjacent the inwardly curved portion of said curved tension member at the top of the belt.

3. A belt as defined in claim 1 in which said compressible section is formed by two soft rubber members, each approximately triangular in cross section, and a wrapper surrounding said tension member and said soft rubber members, each of the latter having one side cooperating with the wrapper to form one side of the belt and an open space therebetween.

4. A belt as defined in claim 1 in which said compressible section is formed by two soft rubber members, each approximately triangular in cross section with its inner side lying alongside said inner narrow fabric strip and the laterally outer portion of the next adjacent fabric strip.

5. A belt as defined in claim 1 in which said compressible section is formed by two soft rubber members, each approximately triangular in cross section with the laterally inner edges of both disposed adjacent the longitudinal center line of the inner narrow fabric strip and the space between said two soft rubber members forming a deep ventilating groove in the belt.

STANLEY A. CARLSON.